United States Patent
Geffroy et al.

(10) Patent No.: US 10,995,796 B2
(45) Date of Patent: May 4, 2021

(54) METHOD FOR PRODUCING A HYDROSTATIC FLUID BEARING WITH CELLS

(71) Applicant: SAFRAN AIRCRAFT ENGINES, Paris (FR)

(72) Inventors: Christian Geffroy, Gaillon (FR); John-Fitzgerald Le Foulon, Le Plessis Hebert (FR); Pascal Ridelaire, Saint Marcel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 116 days.

(21) Appl. No.: 15/519,009

(22) PCT Filed: Oct. 12, 2015

(86) PCT No.: PCT/FR2015/052734
§ 371 (c)(1),
(2) Date: Apr. 13, 2017

(87) PCT Pub. No.: WO2016/059332
PCT Pub. Date: Apr. 21, 2016

(65) Prior Publication Data
US 2017/0234366 A1 Aug. 17, 2017

(30) Foreign Application Priority Data
Oct. 14, 2014 (FR) ...................................... 1459850

(51) Int. Cl.
*F16C 33/20* (2006.01)
*F16C 32/06* (2006.01)
(Continued)

(52) U.S. Cl.
CPC .............. *F16C 33/208* (2013.01); *F02K 9/48* (2013.01); *F02K 9/60* (2013.01); *F16C 32/0655* (2013.01);
(Continued)

(58) Field of Classification Search
CPC .......................... B23P 15/003; F16C 2223/42; F16C 2223/30; F16C 33/208; F16C 33/206; F16C 32/0655; F16C 32/0659
See application file for complete search history.

(56) References Cited

U.S. PATENT DOCUMENTS 3,941,434 A 3/1976 Schurger et al.
4,005,916 A 2/1977 Dillon
(Continued)

FOREIGN PATENT DOCUMENTS

CN 201043569 Y 4/2008
CN 101579841 A 11/2009
(Continued)

OTHER PUBLICATIONS

International Search Report issued in corresponding International Application No. PCT/FR2015/052734, dated Feb. 1, 2016 (4 pages—including English language translation).
(Continued)

*Primary Examiner* — Christopher J Besler
(74) *Attorney, Agent, or Firm* — Bookoff McAndrews, PLLC

(57) ABSTRACT

The method comprises depositing a coating of metal material on the inside surface of the body (4) of the stator (36), impregnating said coating with a self-lubricating composite material (20), machining internal cells (28) in the thickness of the coating (10), and machining orifices (34) leading into the cells.

15 Claims, 4 Drawing Sheets

(51) Int. Cl.
*F02K 9/48* (2006.01)
*F02K 9/60* (2006.01)

(52) U.S. Cl.
CPC ...... *F16C 32/0659* (2013.01); *F16C 32/0685* (2013.01); *F16C 33/206* (2013.01); *F05D 2240/53* (2013.01); *F16C 2202/10* (2013.01); *F16C 2208/32* (2013.01); *F16C 2223/42* (2013.01); *F16C 2240/44* (2013.01); *F16C 2240/60* (2013.01)

(56) References Cited

U.S. PATENT DOCUMENTS

| | | | |
|---|---|---|---|
| 4,732,818 A * | 3/1988 | Pratt | B22F 7/04 419/10 |
| 2001/0048777 A1 * | 12/2001 | Brune | F16C 32/0659 384/100 |
| 2005/0025977 A1 | 2/2005 | Adam et al. | |
| 2008/0226933 A1 * | 9/2008 | Bickle | F16C 33/201 428/545 |
| 2009/0074337 A1 | 3/2009 | Kashchenevsky | |
| 2010/0310763 A1 * | 12/2010 | Oboodi | B22F 7/04 427/191 |
| 2011/0167587 A1 | 7/2011 | Shimp et al. | |
| 2012/0257846 A1 * | 10/2012 | Derrick | F16C 32/0659 384/118 |
| 2014/0064641 A1 * | 3/2014 | Kurata | F16C 33/201 384/13 |
| 2014/0099048 A1 * | 4/2014 | Kurata | F16C 33/201 384/42 |

FOREIGN PATENT DOCUMENTS

| | | | | |
|---|---|---|---|---|
| CN | 103089622 A | | 5/2013 | |
| CN | 103909469 A | | 7/2014 | |
| DE | 102010018328 A1 * | | 10/2011 | ............ B32B 15/08 |
| FR | 2809782 A1 | | 12/2001 | |
| GB | 1085203 A | | 9/1967 | |
| JP | H07-139543 A | | 5/1995 | |
| JP | 2001335914 A | | 12/2001 | |
| JP | 2007232113 A | | 9/2007 | |
| RU | 2274776 C2 | | 4/2006 | |
| RU | 2425261 C1 | | 7/2011 | |
| SE | 7411953 A | | 4/1975 | |
| WO | WO-2012147781 A1 * | | 11/2012 | ............ F16C 33/201 |
| WO | WO-2013094064 A1 * | | 6/2013 | ............ F16C 33/145 |

OTHER PUBLICATIONS

Office Action in corresponding JP Application No. 2017-519819, dated Jul. 30, 2019. (4 pages).
Search Report dated Apr. 14, 2017, in corresponding Chinese Patent Application No. 201580055800.6 (2 pages).
Official Communication dated Jul. 30, 2020, in BR Application No. 112017007652-7 (6 pages).

* cited by examiner

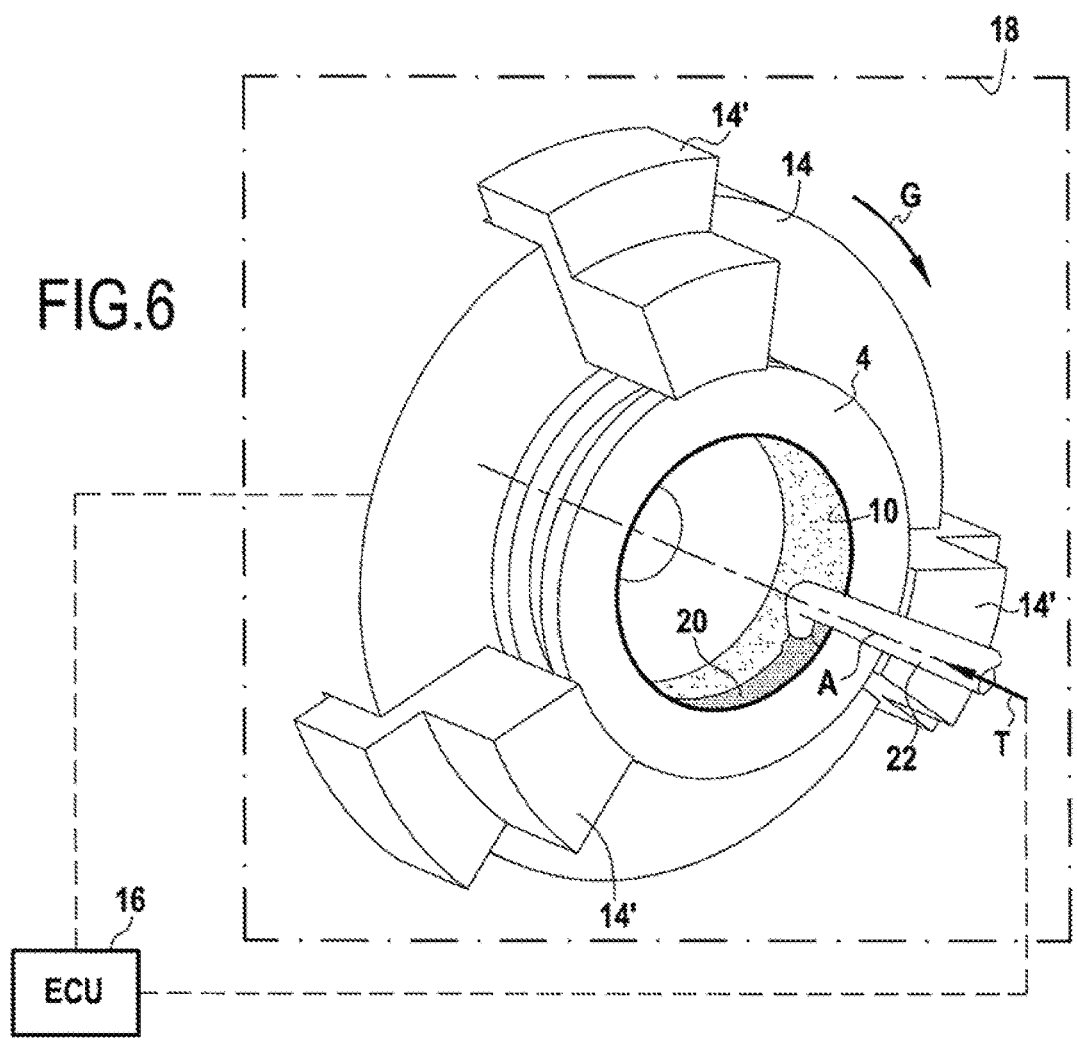
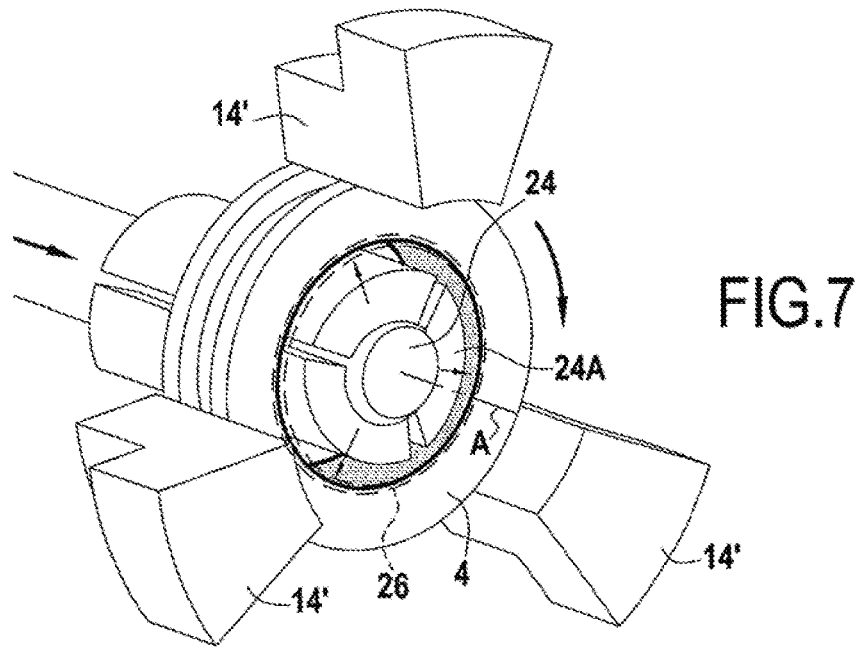

METHOD FOR PRODUCING A HYDROSTATIC FLUID BEARING WITH CELLS

CROSS-REFERENCE TO RELATED APPLICATIONS

This application is the U.S. national phase entry under 35 U.S.C. § 371 of International Application No. PCT/FR2015/052734, filed on Oct. 12, 2015, which claims priority to French Patent Application No. 1459850, filed on Oct. 14, 2014, the entireties of which are herein incorporated by reference.

GENERAL TECHNICAL FIELD

The present description relates to the field of hydrostatic fluid bearings with cells for supporting rotary shafts, in particular in rocket engine turbopumps for putting fluid under pressure.

STATE OF THE ART

As stated in French patent application No. 2 809 782, such a bearing comprises an annular stator in which a rotor is received, e.g. a rotor constituting the shaft of a turbopump. In its annular inside surface, the stator has cells that are fed with fluid via orifices that lead to its outer surface. Thus, the rotor is held by being suspended in the stator on a thin layer of fluid under pressure as introduced via the orifices in the cells.

More precisely, French patent application No. 2 809 782 relates to a hydrostatic fluid bearing having a cylindrical stator that includes on its inside surface a ring that is constituted by assembling a metal plate having orifices that co-operate with the fluid insertion orifices, and a layer of self-lubricating composite material that includes cells that are arranged around the orifices.

Such a bearing presents a layer of composite material on its inside surface that is of a thickness enabling it to wear without running the risk of irreparable damage to the shaft or the bearing in the event of shaft-bearing contacts, thus also making it possible to have transient stages without assistance.

The method of fabricating such a bearing, as described in French patent application No. 2 809 782 and as set out briefly below with reference to accompanying FIGS. 1 to 3, comprises steps of assembling a layer of self-lubricating composite material 3 on a surface of a plane metal plate 2 of dimensions corresponding to the development of the inside surface of the stator, machining cells 5 in the thickness of the layer of composite material in the assembly 1, curving the assembly 1 into the form of a split ring 6, inserting the assembly in the form of a split ring 6 against the inside surface of the stator 4, and machining orifices 7 through the thickness of the stator and the inserted assembly into the cells 5.

That method is effective and reliable. Nevertheless, it requires the use of a plane metal plate that is to receive the composite material. The length of the plate needs to be calculated with great accuracy, on the basis of the development of the cylindrical surface. Furthermore, curving the plate into the shape of a split ring prior to putting it into place in the stator is a step that is difficult to perform, and that affects the shape of the cells. It should also be observed that the orifices are machined through a sandwich comprising the base material of the stator, the material of the plate, and the composite material. These three materials have different hardnesses, so that machining is relatively complex.

SUMMARY

There thus exists a need for a method of fabricating a hydrostatic fluid bearing having a stator with a cylindrical inside surface that includes cells, which method is substantially exempt from the above-mentioned drawbacks.

Thus, in an aspect, the invention provides a method of fabricating a hydrostatic fluid bearing comprising a stator having a cylindrical inside surface that includes cells, the method comprising:

depositing a coating of metal material on the inside surface of the body of the stator;

impregnating said coating with a self-lubricating composite material;

machining internal cells in the thickness of the coating, and machining orifices leading into the cells.

Thus, with the invention, the metal material is deposited directly on the inside surface of the stator and it is impregnated with self-lubricating composite material while it is already coating that surface. This avoids having recourse to a plane plate that needs to be cut out to the right dimensions and curved, while also making it possible to have a coating of composite material that is of significant thickness. The metal coating adheres effectively to the inside surface of the stator body and the composite material is itself secured to the metal coating by being caused to penetrate into its thickness by impregnation. Thus, the self-lubricating composite coating formed by the metal coating impregnated with self-lubricating composite material and occupying the same significant thickness as the metal coating, is secured effectively to the inside surface of the stator body. Furthermore, the cells are machined in the self-lubricating composite coating and can be very accurate in shape, being unaffected by an operation, such as curving, that is performed after they have been machined. The cells may be machined on a turning center having a 5-axis milling spindle and an angle head, in particular an angle head of ultra-high speed (UHS) type with precision numerical control. In addition, machining of the orifices is simplified compared with the above-mentioned prior art, since the curved intermediate plate is omitted.

Optionally, the metal material comprises bronze.

Optionally, the self-lubricating composite material comprises polytetrafluoroethylene.

Optionally, after impregnating the coating and in particular while machining the internal cells, the bore of the coated inside surface is subjected to re-boring.

With the invention, this step of rectifying the bore formed by the inside surface of the body of the stator, can be performed when the coating is in place on the surface, and with great accuracy. This re-boring can be performed with a cutting tool or by regrinding the inside surface of the body of the stator. Furthermore, the regrinding may be performed in the same operation as machining the cells, without disassembly. Optionally, automatic deburring of the edges of the cells may be performed in this operation, by deburring tools.

Optionally, the coating is deposited by thermally spraying particles of metal material against the inside surface of the stator.

This technique is found to be particularly appropriate for performing the method of the invention. Firstly it is flexible in use, in particular insofar as it makes it possible to vary the thickness of the coating. Specifically, with this technique, the metal material is sprayed onto the inside surface of the stator using a spray gun that moves relative to the surface. In order to increase the thickness of the coating, it suffices to act on the relative speed between the gun and the stator, or indeed to perform one or more additional passes with the gun.

Furthermore, surprisingly, the inventors have observed that this technique serves to enhance impregnation of the coating with the composite material, since the coating obtained using this technique presents a certain amount of porosity, with its pore volume fraction possibly lying in the range 1% to 10%.

Optionally, the coating is deposited in an environment that is less oxidizing than air, in particular in a closed enclosure in which there is an inert gas.

This makes it possible to avoid oxidation at the interface between the coating and the coated surface. By way of example, this inert gas may be nitrogen.

Optionally, the coating is deposited by making at least one internal layer of coating against the cylindrical inside surface and making at least one top layer of coating against said internal layer, the top layer presenting porosity that is greater than the porosity of the internal layer.

The internal layer(s) serve to provide bonding between the coating and the coated surface. It is therefore advantageous for them to have little porosity, e.g. a pore fraction of about 1% or even less. In contrast, it is advantageous for the top layer(s) to have greater porosity, thereby enhancing their impregnation with the self-lubricating material.

Optionally, deposition of the coating is followed by heat treatment, that precedes impregnating the coating.

This heat treatment serves to relax stresses in the coating or between the coating and the inside surface of the body of the stator and serves to make the coating more uniform prior to being impregnated. This heat treatment may be quenching.

Optionally, the coating is impregnated by applying the composite material to the coating and pressing it against the coating.

Optionally, the coating is impregnated by applying the self-lubricating composite material to the coating in the form of a paste including a self-lubricating component.

BRIEF DESCRIPTION OF THE FIGURES

Other characteristics and advantages of the invention appear from the following description of an embodiment of the invention given by way of non-limiting example and with reference to the accompanying drawings, in which:

FIG. 6 shows the application of the self-lubricating composite material on the coating;

FIG. 7 shows the composite material being pressed against the coating;

DETAILED DESCRIPTION

Figure 1:
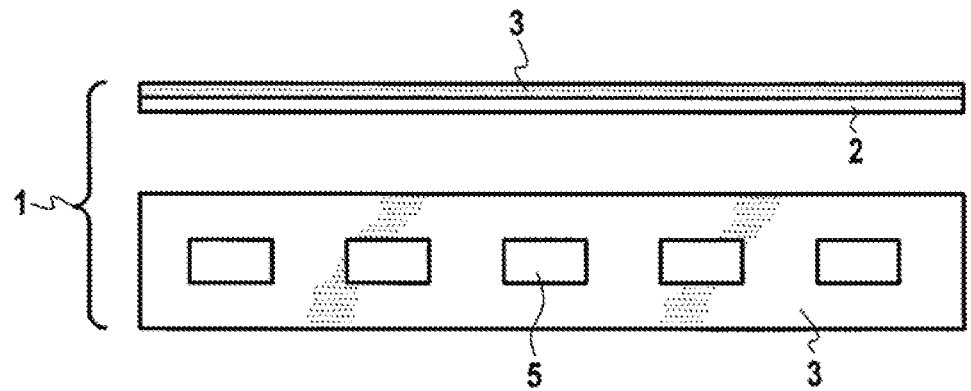
FIGS. 1 to 3, described above, show the prior art method.
Figure 2:
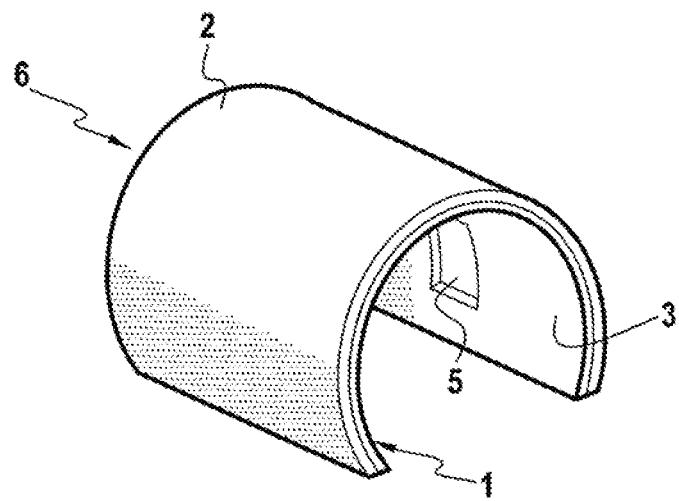
Figure 3:
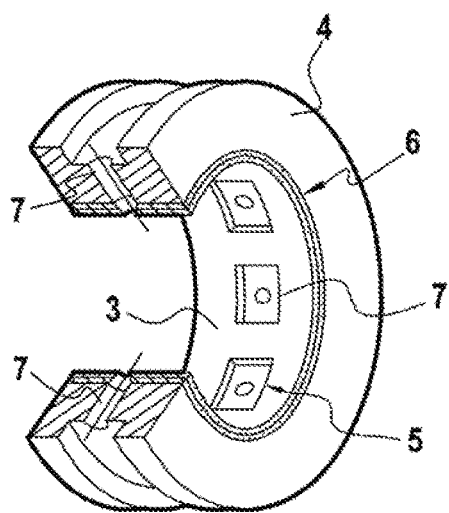
Figure 4:
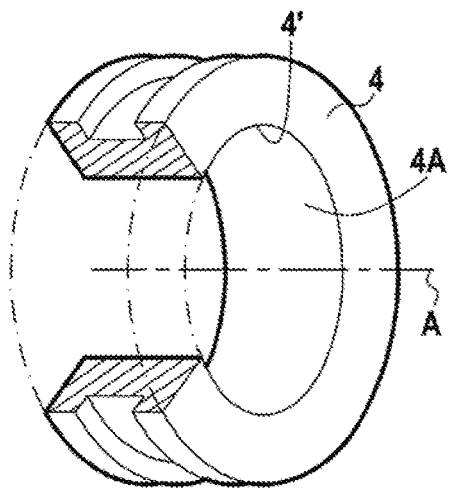
FIG. 4 is a fragmentary isometric view of the body of a stator, prior to depositing a coating on its inside surface.

Like the prior art method described with reference to FIGS. 1 to 3, the method of the present invention applies to a stator body 4. This body is shown in FIG. 4. It comprises an annular cylindrical body having a cylindrical inside surface 4A that defines a central bore 4'. For example, the body 4 may be made out of a hard alloy, in particular having a Brinell hardness number (HB) greater than 300, or even 330 HB, e.g. an alloy known by the name Inconel 718.

Figure 5:
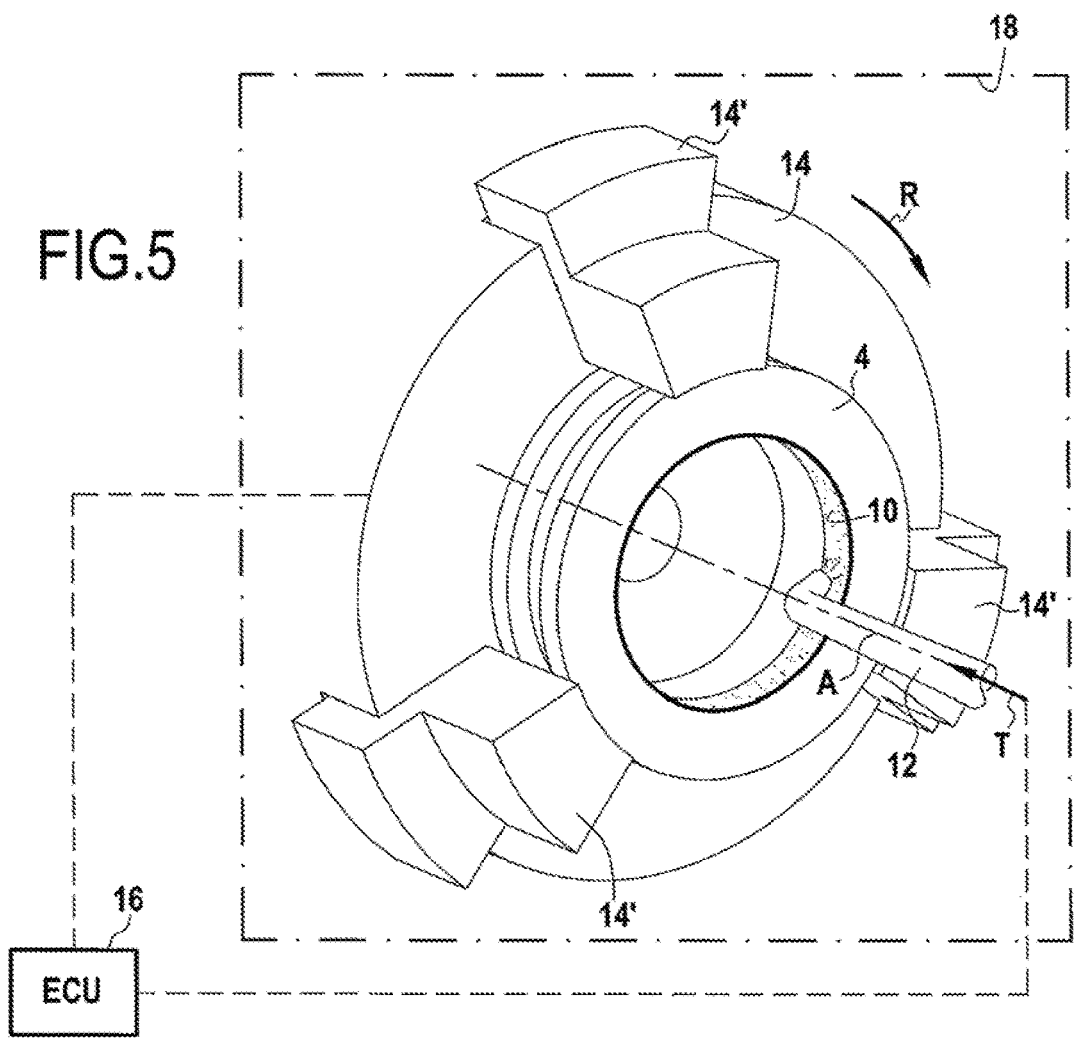
FIG. 5 shows the coating being deposited by spraying.

FIG. 5 shows a coating 10 being deposited on the cylindrical inside surface of the body 4. Specifically, this deposition is performed by spraying using a spray gun 12 having its head pointing towards the surface 4A.

In FIG. 5, the body 4 is held in a support 14 having jaws 14' that clamp onto the body. The body 4 and the gun 12 are movable relative to each other. For example, the gun 12 may be movable in translation T parallel to the axis A of the inside surface of the body 4, while the support 14 may be movable in rotation R above that axis. These movements are controlled by an electronic control unit (ECU) 16 so as to be synchronized and while also taking account of the delivery rate of the gun, in order to obtain the desired thickness for the coating 10.

This device for depositing the coating may be arranged inside an enclosure 18 in which the atmosphere is not oxidizing, or indeed less oxidizing than ambient air. In particular, the enclosure may be filled with an inert gas, such as nitrogen.

The metal material used for forming the coating 10 may be aluminum, copper, stainless steel, nickel, or indeed an alloy based on those materials, in particular an alloy of aluminum and nickel. The material may advantageously be bronze.

The metal material may be sprayed by thermal spraying. For example, this may be high velocity oxy-fuel (HVOF) spraying or supersonic flame spraying or plasma spraying in which the particles of material are melted and accelerated by a gaseous plasma, or indeed it may comprise dynamic cold spraying in which particles are accelerated and projected in the powder state against the surface 4A of the body 4.

The particles of metal materials used for spraying may for example have an equivalent diameter lying in the range 5 micrometers (μm) to 40 μm, in particular when the spray technique used is dynamic cold spraying.

In order to obtain the desired coating thickness, the coating may be deposited as a plurality of superposed layers, e.g. by a plurality of successive passes of the gun 12. Under such circumstances, it is advantageous for porosity to vary as a function of the layer so that porosity increases on going away from the wall 4A of the body 4. For example, the volume fraction of the pores in the internal layer in contact with the surface 4A of the body 4 may be about 1%, whereas the volume fraction of the top layer closest to the axis A may be about 10%.

Once the coating 10 has been made, it is impregnated with a self-lubricating composite material.

To do this, a layer of self-lubricating composite material 20 is initially applied to the coating 10, as shown in FIG. 6. This material may be applied in the form of a paste, e.g. using an applicator 22 that is movable relative to the stator 4. For example, the stator is held by the support 14 of FIG. 5 or by an analogous support, and it may be moved in rotation R, while the applicator 22 may be moved in translation T.

Thereafter, the composite material 20 is pressed against the coating 10. This is shown in FIG. 7, in which it can be seen that while the stator body 4 is carried by jaws 14' analogous to those of FIG. 4, an expandable mandrel 24 is inserted in the central bore 4' of the body. The mandrel has sectors 24A that, starting from a rest configuration enabling the mandrel to be inserted in the bore 4', are suitable for being moved radially outwards in order to deploy the mandrel 24. This expansion exerts pressure on the layer of composite material 20 and tends to cause it to penetrate into the pores of the coating 10. Furthermore, it is possible to perform the pressing as a plurality of successive stages, between which the mandrel 24 and the stator body are moved angularly relative to each other so that the zones occupied by the gaps between the sectors 24A in one stage are covered by the sectors in a later stage.

Application of composite materials to the coating 10 may be preceded by applying heat treatment to the coating, in particular quenching.

The composite material paste is thus hardened while performing the pressing. During pressing, the material is confined radially. In order to avoid the pressed composite escaping axially from the stator, it is possible to use confinement rings 26 or the equivalent that are pressed against the axial ends of the stator body and that cover the coating 10 and the layer of composite material 20 axially.

The self-lubricating composite material may comprise polytetrafluoroethylene (PTFE). For application to the coating, this material may for example be put into the form of a paste.

Figure 8:
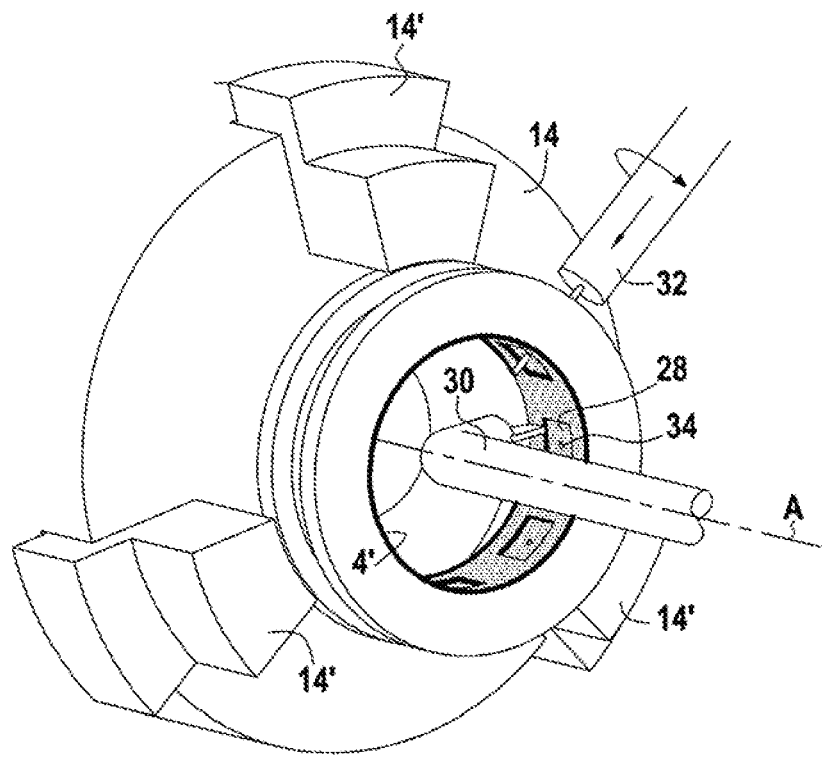
FIG. 8 shows the stage of machining cells and machining orifices leading into the cells.

FIG. 8 shows the machining step that follows the impregnating step. In the machining step, internal cells 28 are machined in the thickness of the coating 10 by using a cutter 30 mounted on a numerically controlled UHS angle head or the like. During this machining, the stator body continues to be held by jaws 14' or the like. The depth of the cells 28 is less than the thickness of the coating 10 impregnated with composite material, this depth and this thickness being measured radially. By way of example, the depth of the cells lies in the range 0.3 millimeters (mm) to 0.6 mm, while the thickness of the coating lies in the range 0.8 mm to 2 mm.

FIG. 8 also shows a drill tool 32 that is mounted in the 5-axis milling spindle head and that is used for drilling orifices 34 for feeding fluid to the cells. These feed orifices, specifically one orifice per cell, are oriented radially and they pass through the wall of the stator 4. These orifices 34 enable the cells 28 of the bearing to be fed with fluid under pressure in order to perform the rotary shaft support mechanism that is specific to hydrostatic bearings. Optionally, the cells may have some other number of feed orifices. They may also have one or more other orifices for performing other functions, such as for example measuring pressure by means of a sensor.

The operations of machining the cells and drilling the cells by using sharp tools may be performed in the same work station and in parallel. It is also possible in the same station to perform final re-boring of the surface of the bore 4' of the stator. This final re-boring, which is performed on the coating 10 impregnated with the self-lubricating composite material, may be performed at the same time as machining the cells 28 or after that machining, and possibly after machining the orifices 34.

Figure 9:
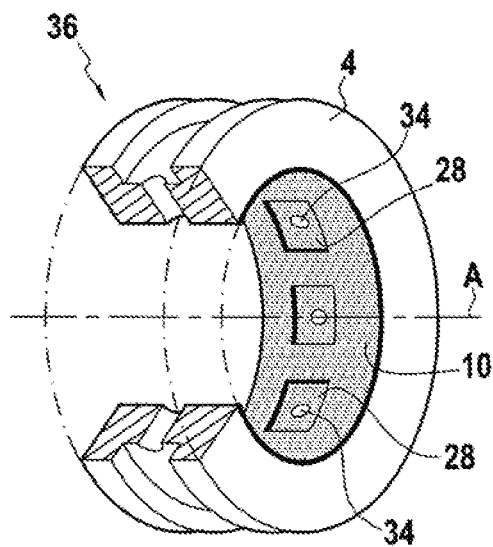
FIG. 9 is a fragmentary isometric view of the stator.

FIG. 9 shows the hydrostatic fluid bearing stator 36 obtained by the invention. The stator comprises a body 4 having its inside surface 4A coated in the metal coating 10 into which the self-lubricating composite material is impregnated. The metal coating adheres directly to the original inside surface of the body of the stator without interposing any separate interface plate, unlike the disclosure of French patent application No. 2 809 782. The stator 36 also presents in the coated inside surface the cells 28 having bottoms that are likewise covered in the impregnated metal coating, and its annular wall is pierced by the orifices 34 for feeding the cells with fluid.

The self-lubricating composite coating, i.e. the metal coating impregnated with the self-lubricating composite material, may present considerable thickness, e.g. lying in the range 0.8 mm to 2 mm. It thus enables fitting operations to be performed such as final re-boring or in-line reworking of the bearings such as pairing or aligning two bearings.

Still because of the considerable thickness of the self-lubricating composite coating on the inside surface of the bearing stator, transient stages while starting and stopping turbopumps, in particular cryogenic turbopumps, are made easier by the increased tolerance to shaft-bearing contacts, thus also enabling such bearings to better withstand failures, given their endurance when faced with such contacts.

The invention claimed is:

1. A method of fabricating a hydrostatic fluid bearing comprising a stator having a right circular cylindrical inside surface of a body of the stator that includes cells, the method comprising the following successive steps:
   depositing a coating of metal material on the right circular cylindrical inside surface of the body of the stator;
   impregnating said coating with a self-lubricating composite material;
   machining the cells in a direction of a thickness of the coating so that a periphery of each of the cells is surrounded by the right circular cylindrical inside surface of the stator, and machining orifices leading into the cells, wherein the thickness of the coating is in the range 0.8 mm to 2 mm, and the cells have a depth in the direction of the thickness of the coating in the range 0.3 mm to 0.6 mm.

2. A method according to claim 1, wherein the metal material comprises bronze.

3. A method according to claim 1, wherein the self-lubricating composite material comprises polytetrafluoroethylene.

4. A method according to claim 1, wherein after impregnating the coating, the coated right circular cylindrical inside surface is subjected to re-boring.

5. A method according to claim 1, wherein the coating is deposited by thermally spraying particles of the metal material against the right circular cylindrical inside surface of the stator.

6. A method according to claim 1, wherein the coating is deposited in an environment that is less oxidizing than air.

7. A method according to claim 1, wherein the coating is deposited by making at least one internal layer of coating against the right circular cylindrical inside surface and making at least one top layer of coating against said internal layer, the top layer presenting porosity that is greater than the porosity of the internal layer.

8. A method according to claim 1, wherein deposition of the coating is followed by heat treatment, that precedes impregnating the coating.

9. A method according to claim 1, wherein the coating is impregnated by applying the composite material to the coating and pressing it against the coating.

10. A method according to claim 1, wherein the coating is impregnated by applying the self-lubricating composite material to the coating in the form of a paste.

11. A method according to claim 1, wherein, while machining the internal cells, the coated right circular cylindrical inside surface is subjected to the re-boring.

12. A method according to claim 1, wherein the coating is deposited in a closed enclosure in which there is an inert gas.

13. A method according to claim 1, wherein machining the cells in the thickness of the coating comprises machining at least three internal cells.

14. A method of fabricating a hydrostatic fluid bearing comprising a stator having a right circular cylindrical inside surface of a body of the stator that includes cells, the method comprising the following successive steps:

depositing a coating of metal material on the right circular cylindrical inside surface of the body of the stator;

impregnating said coating with a self-lubricating composite material;

machining the cells by removing a partial thickness of the coating in a radial direction of the body of the stator so that a periphery of each of the cells is surrounded by the right circular cylindrical inside surface of the stator, and machining orifices leading into the cells, wherein the thickness of the coating in the radial direction is in the range 0.8 mm to 2 mm, and the cells have a depth in the radial direction in the range 0.3 mm to 0.6 mm.

15. A method according to claim 14, wherein machining the cells in the thickness of the coating comprises machining at least three internal cells.

\* \* \* \* \*